United States Patent [19]

Schampers et al.

[11] 4,121,255

[45] Oct. 17, 1978

[54] TELEVISION CAMERA APPARATUS

[75] Inventors: Paulus Philippus Maria Schampers; Marino Giuseppe Carasso; Frits Theodoor Klostermann, all of Eindhoven, Netherlands

[73] Assignee: U.S. Philips Corporation, New York, N.Y.

[21] Appl. No.: 663,269

[22] Filed: Mar. 3, 1976

[30] Foreign Application Priority Data

Mar. 24, 1975 [NL] Netherlands ........................ 7503462

[51] Int. Cl.$^2$ ................................................ H04N 5/34

[52] U.S. Cl. .................................................... 358/223

[58] Field of Search ........................ 178/7.2, DIG. 42; 358/223; 313/367, 384, 372, 398; 315/383.10

[56] References Cited

U.S. PATENT DOCUMENTS

| | | | |
|---|---|---|---|
| 2,404,098 | 7/1946 | Schade | 178/7.2 |
| 2,655,554 | 10/1953 | Johnson | 178/7.2 |
| 3,284,652 | 11/1966 | Yaggy | 313/398 |
| 3,433,994 | 3/1969 | Gibson, Jr. | 178/7.2 X |
| 3,683,108 | 8/1972 | Pieters | 178/7.2 |
| 3,710,173 | 1/1973 | Hutchins et al. | 313/398 X |
| 3,764,738 | 10/1973 | Zettle et al. | 178/7.2 |
| 3,825,791 | 7/1974 | Kazan | 313/398 |
| 3,878,324 | 4/1975 | Tubbs et al. | 178/7.2 |
| 3,931,466 | 1/1976 | Van den Berg | 178/7.2 |

FOREIGN PATENT DOCUMENTS

| | | | |
|---|---|---|---|
| 1,247,647 | 9/1971 | United Kingdom | 358/223 |
| 1,070,621 | 6/1967 | United Kingdom | 358/223 |

OTHER PUBLICATIONS

The International Dictionary of Physics and Electronics ©1956 by D.V. Nostrand Co., Inc. pp. 670, 671, 814.

*Primary Examiner*—John C. Martin
*Assistant Examiner*—Aristotelis M. Psitos
*Attorney, Agent, or Firm*—Frank R. Trifari; Carl P. Steinhauser

[57] ABSTRACT

The target of a television camera tube comprises photoconductive material in the form of a regularly interrupted structure so that both the photoconductive material and parts of the signal electrode are accessible to the electron beam. The potential difference between the signal electrode and the cathode is adjusted so that during scanning, the signal electrode accepts a proportion of the beam current dependent on the local potential of the photoconductor surface, and the photoconductor is stabilized only during fly-back. The camera tube thus has an adjustable inherent amplification without increased inertia.

8 Claims, 7 Drawing Figures

Fig. 6
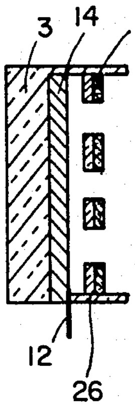
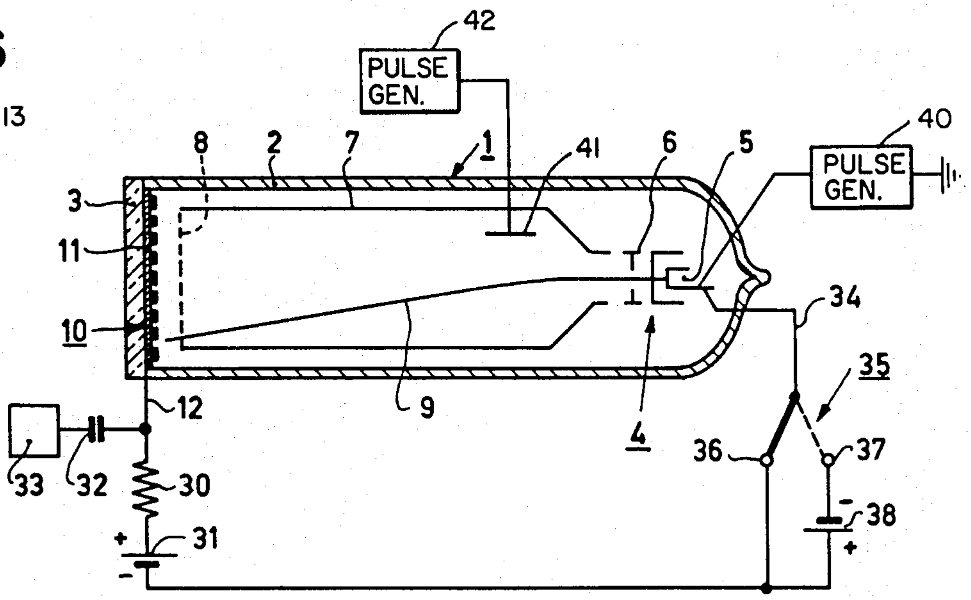
Fig. 1
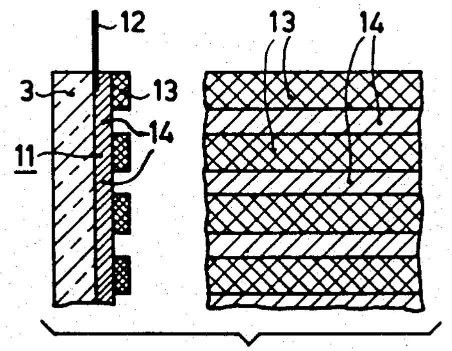
Fig. 2
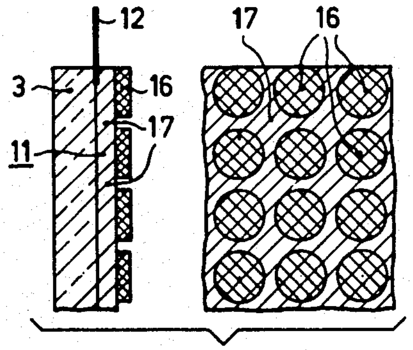
Fig. 3
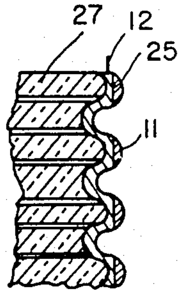
Fig. 7
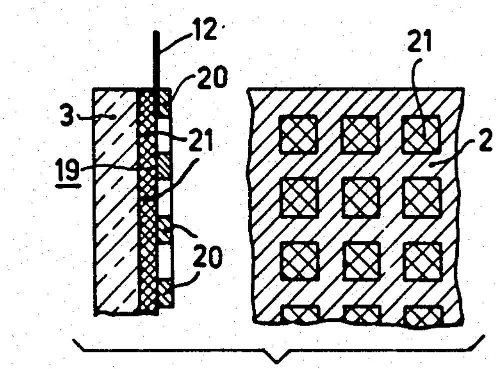
Fig. 4
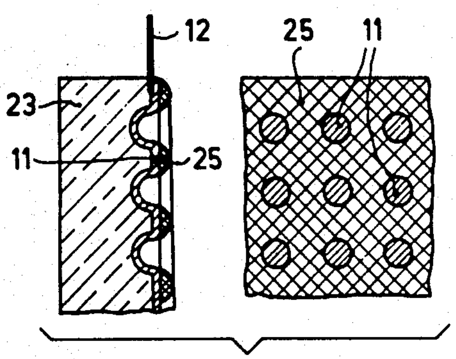
Fig. 5

TELEVISION CAMERA APPARATUS

The invention relates to television camera apparatus including a television camera tube having an electron source to produce an electron beam for scanning a target comprising photoconductive material arranged for illumination by a scene viewed by the camera and further comprising an electrically continuous signal electrode.

A camera tube of this kind if known, for example, from British Patent Specification No. 1,070,621. The camera tube described therein serves to convert an optical image projected onto the target into a potential pattern which is converted into an electrical image signal by scanning with a beam of slow electrons from the electron source. A locally larger or smaller proportion of the electron beam current, dependent on the local potential of the photoconductive material which is in turn dependent on the local degree of illumination, is used for stabilizing the photoconductive layer, and beam current splitting is thus introduced by the beam acceptance of the target.

An object of the present invention is to provide television camera apparatus wherein an adjustable inherent amplification can be realized utilizing the beam acceptance of the target, for example, a range of inherent amplification of up to one decade.

A further object of the invention is to provide television camera apparatus in which inherent amplification can be obtained without additional inertia.

To this end, a television camera tube of the aforesaid type has a target of photoconductive material exhibiting a pattern of discrete elements. A potential pattern generated by image information is switchable, by means of a switching device, between the electron source and the signal electrode between potential levels such that a locally varying portion of the electron beam is intercepted by uncovered parts of the signal electrode during the forward movements without stabilizing the photoconductive parts. A electron beam stabilizes the potential pattern during return movements.

Because the photo-conductive material in television camera apparatus embodying the invention is not stabilized by the electron beam during scanning, amplification can be realized with the tube. By analogy with a vacuum triode amplifier tube, the pattern of photo-conductive material performs the function of a control grid, and the signal electrode performs the function of an anode. Television camera apparatus of this kind is particularly suitable for use in conditions in which a comparatively low light level is desired or necessary for external reasons. The further control and equipment for television apparatus embodying the invention need not be substantially modified, which is in contrast with other television camera apparatus suitable for low light levels, using a separate image intensifier.

The invention will now be described in detail with reference to the accompanying diagrammatic drawing, in which:

FIG. 1 shows schematically television camera apparatus embodying the invention, and FIGS. 2–7 are partial sectional and plan views of six different targets suitable for television camera apparatus embodying the invention.

FIG. 1 includes a cross-sectional view of a television camera tube 1 of the vidicon type. This camera tube comprises, inside an envelope 2 with an optically transparent window 3, an electron gun 4 having a cathode 5, one or more control grids 6, and an anode 7. On or near the end of the anode 7 which is remote from the electron gun there is provided a mesh electrode 8 whereby an electron beam 9 from the gun 4 can be directed substantially perpendicularly onto a target 10. Using electromagnetic coils (not shown) which are preferably arranged about the camera tube, or using electrostatic electrodes (not shown), preferably arranged in the camera tube, the electron beam can be focussed on and scanned across the target. In this embodiment, the target 10 comprises an optically transparent signal electrode 11 which consists, for example, of a layer of electrically conductive tin oxide which is deposited on the inner side of the window 3 and to which electrical connection can be made outside the envelope via a lead-through 12.

Six different forms of target are shown in FIGS. 2 to 7. Referring to FIG. 2, the signal electrode 11 is formed on the window 3 as an uninterrupted layer and is partially covered by a regular line pattern consisting of parallel strips of photo-conductive material 13 with intermediate uncovered portions 14 on its surface facing the electron gun. The strips of photoconductive material 13 consists, for example, of lead monoxide and have a width of, for example, 20–50 microns and a thickness of 10 to 30 microns. The intermediate portions 14 each have a width which may, for example, be equal to, but preferably is less than, the width of the photo-conductive strips. The width of the intermediate portions may be limited, for example, to 10% of the width of the photoconductive strips.

A regular pattern of photoconductive elements can also be formed as discrete p-n junctions, for example, in a silicon disc which then also serves as the signal electrode.

FIG. 3 shows a structure wherein the photoconductive material is deposited on an uninterrupted signal electrode 11 in the form of dots 16. The dots are preferably dimensioned such that they are just separated from one another and each dot is bounded by intermediate portions 17 of electrically conductive material of the signal electrode.

FIG. 4 shows a target wherein an uninterrupted photoconductive layer 19 provided directly on the window 3 is partly covered by a regularly apertured electrode 20, on the electrode being formed, for example, by a two fold vapour-deposition in two stages of silver through a single shaped wire grid which is rotated over substantially 90° between the two stages. Vapour deposition should be effected such that the signal electrode forms an electrically continuous structure, through the apertures of which areas 21 of photoconductive material are accessible to the electron beam.

In FIG. 6, the target comprises a signal electrode 11 provided on the window 3, and a grid 26, preferably consisting of transparent, conductive material on which the photoconductive material 13 is provided and which is arranged at a small distance therefrom.

FIG. 5 shows a target wherein cavities have been etched in the surface of a glass plate 23; the non-interrupted signal electrode 11 has then been coated onto the plate, including the cavities therein, and photoconductive material 25 deposited on the electrode, for example, by vapour deposition, over the unetched portions between the cavities. The glass plate 23 preferably constitutes the window of the camera tube. An optical fiber plate as shown in FIG. 7 is particularly suitable for this purpose: the cladding glass of each of the fibers is partly removed by etching one surface of the plate, and the photoconductive material is then positioned exactly on the end of the glass core of each fiber. This is favourable for proper light transmission through the window.

Referring again to FIG. 1, the lead-through 12 of the signal electrode is connected through a signal resistor 30 to a voltage source 31 and, via a capacitor 32, to an image signal or video amplifier 33. A lead-through 34 for the cathode of the electron source is connected to the voltage source 31 by switching means indicated schematically at 35 and comprising poles 36 and 37 respectively enabling connection without and with an addition series voltage source 38.

During operation, the target whereon an image is projected, is scanned by the electron beam 9 with the signal electrode at a given potential, the local potential of the free surface of the photoconductive material facing the electron gun will attain a value which is a function of the local illumination. A larger or smaller proportion of the beam current will accordingly flow through the target for each elemental area thereof. Because the surface potential in the illuminated image areas is also lower than the potential of the signal electrode, the electron beam will not be intercepted by the photoconductor, but will be attracted by the adjoining free surface portions of the signal electrode intermediate portions of the photoconductive material. During scanning (i.e. forward line scan), the switch 35 is arranged to connect the cathode directly to the voltage source 31, which has a magnitude such That the free surface of the photoconductor is not stabilized at cathode potential. As a result, a larger proportion of the scanning beam can be accepted than for a similar non-interrupted layer of photoconductive material in a conventional camera tube, in which a stabilizing effect immediately occurs, with a consequent decrease of the current which can be accepted. In a television camera tube embodying the invention, the signal current is proportional to the beam current; this is not the case for a known television camera tube owing to the stabilizing action. As a result, the inherent amplification of a tube embodying the invention can be simply adjusted by adjusting the beam current. The amplification realized is given by the ratio between the current actually accepted by the target and the current which could be accepted in the case of a non-interrupted photoconductor stabilised by the electron beam during scanning. Calculations have indicated that it should be possible to realise an amplification of 5 to 10 using lead monoxide as the photoconductive material.

The potential pattern which is produced by the instantaneous image information, and which is not stabilized during reading (i.e. scanning) can be stabilized, for example, by the electron beam during the line flyback. By omitting the conventional suppression of the beam during flyback and by making the cathode more negative with respect to the signal electrode by switching in the source 38 via the switch 35, the potential can be stabilized over the relevant line. The potential of the surface of the photoconductor facing the electron source thus always remains negative with respect to the signal electrode. Because no image information is extracted during stabilisation, the beam need not be focussed, but the beam must not, during flyback, influence the next line to be scanned. In order to achieve fast, complete stabilization, it is advantageous to provide the electron source of a television camera tube in apparatus embodying the invention with means which enable a comparatively high-current electron beam to be delivered during line flyback. An electron source as described in U.K. Patent Specification No. 1,190,186 is particularly suitable for this purpose. The defocussing of the beam during flyback can then be limited, for example, to a target spot width corresponding, for example, to approximately 10 lines. In order to prevent this target spot from also stabilizing one or more lines yet to be scanned, the apparatus is suitably provided with electron-optical means for lifting the beam during flyback slightly in the image direction away from the part of the target still to be scanned in this period. For this purpose, use can be made of a device as described in U.K. Patent Specification 1,247,647 including cathode potential switching involving reversed polarity of the cathode control during flyback. This is shown in FIG. 1 in which a pulse generator 40 supplies a negative pulse to the cathode during flyback, and a pulse generator 42 supplies a negative pulse to deflection element 41. It is not necessary to stabilize during each line flyback; it may, for example, be sufficient to stabilize during every other flyback or up to one out of ten flybacks. Using the amplification in a camera apparatus embodying the invention, any change in potential resulting from current in the photoconductive material is fully amplified. Therefore, it is desirable to use a photoconductor having a comparatively small dark current, such as, for example, lead monoxide, and to prevent as far as possible, illumination of the target other than by the image to be displayed. The use of a cold cathode or a properly screened filament cathode in the electron source can be suitable in this respect. A cold cathode offers the additional advantage that the velocities of the electrons in a beam derived therefrom are more nearly the same.

The means by which amplification can be obtained in apparatus embodying the invention does not result in the inertia of the tube increasing as the amplification increases, as is the case in camera tubes wherein a grid is set at a positive potential for amplification and in which read-out and stabilization and reading are simultaneously effected during the line scan.

This absence of additional inertia makes a camera tube embodying the invention particularly suitable for use in conditions in which only a low illumination level is permissible or realizable.

What is claimed is:

1. In a television camera apparatus including a television camera tube comprising an evacuated envelope having an optically transmissive window at one end, an electrically continuous transparent signal electrode supported by said window, a target of photoconductive material having regularly spaced and discrete portions in contact with said signal electrode, and an electron gun for scanning the surface of said target with an electron beam, the improvement wherein regularly spaced and discrete portions of the photoconductive material and portions of the signal electrode substantially intermediate said spaced portions are accessible to the electron beam, the apparatus further including means for scanning the electron beam across the target and means for applying first and second voltages between the signal electrode and the electron source respectively during scanning and during flyback, the first voltage applied during scanning being such that a portion of the electron beam current dependent on the local degree of illumination of the photoconductive material flows into the signal electrode without the potential of a free surface of the photoconductive material being stabilized, and the second voltage being applied during flyback being such that the potential of said surface is stabilised by the electron beam.

2. Apparatus as claimed in claim 1 wherein the photoconductive material is provided on a window of the tube as an uninterrupted layer the free surface of which is partly covered by an apertured signal electrode.

3. Apparatus as claimed in claim 1 wherein the signal electrode is provided on a window of the tube and wherein the photoconductive material is supported on an optically transparent, electrically conductive grid separated from the signal electrode by a small gap.

4. Apparatus as claimed in claim 1 wherein the target is provided on a glass plate having cavities in a surface thereof facing the electron source, wherein the signal electrode covers at least the boundaries of the cavities, and wherein the photoconductive material is supported on portions of said surface which are intermediate the cavities.

5. Apparatus as claimed in claim 4 wherein the glass plate is an optical fiber plate, the cavities being formed in the cladding glass of the optical fibres.

6. Apparatus as claimed in claim 1 wherein the electron beam provides a high current during flyback compared with its magnitude during scanning.

7. Apparatus as claimed in claim 1 including electron-optical means for realizing an additional deflection of the electron beam in the image direction and away from the part still to be scanned during line flybacks.

8. Apparatus as claimed in claim 1 wherein the electron source comprises a cold emissive cathode.

* * * * *